Sept. 10, 1935.  A. BOUSFIELD  2,014,276
COUNTERPOISE MECHANISM FOR TRACK SCALE BEAMS
Original Filed March 19, 1931  2 Sheets-Sheet 2
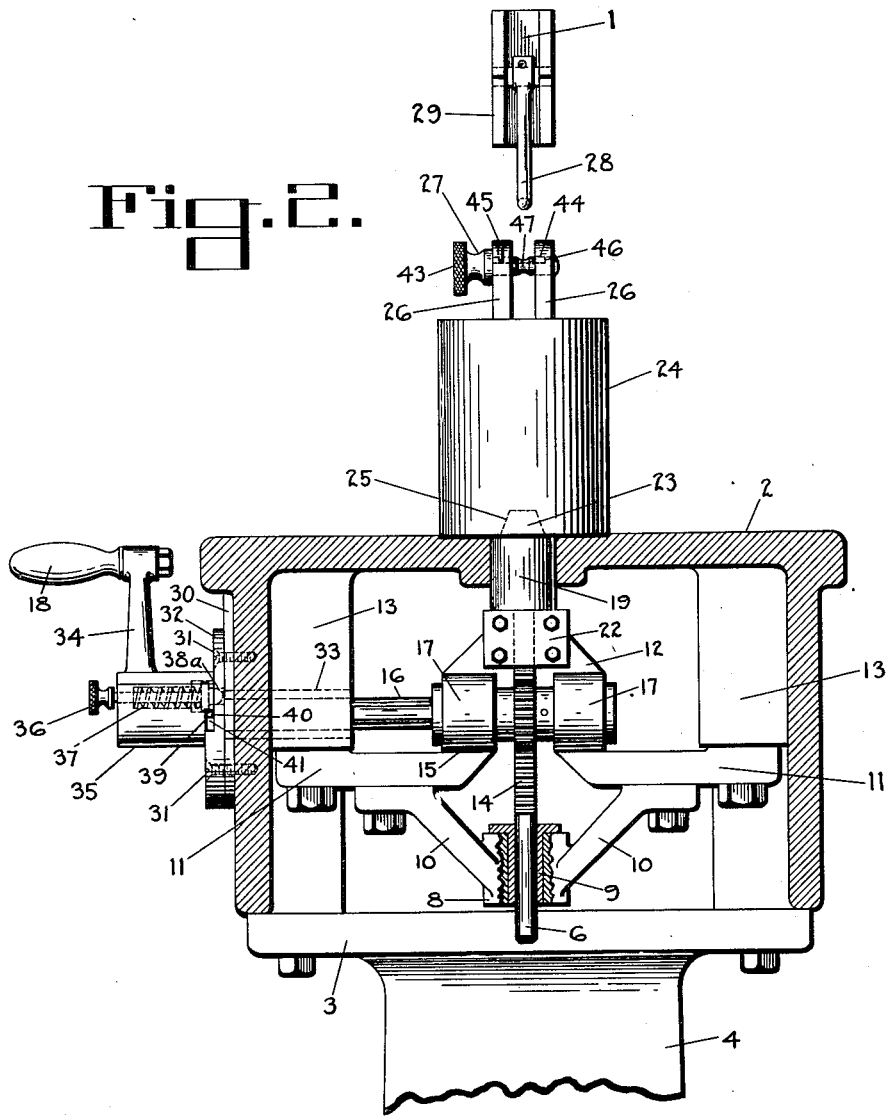
INVENTOR
ALFRED BOUSFIELD
BY
ATTORNEY Patented Sept. 10, 1935

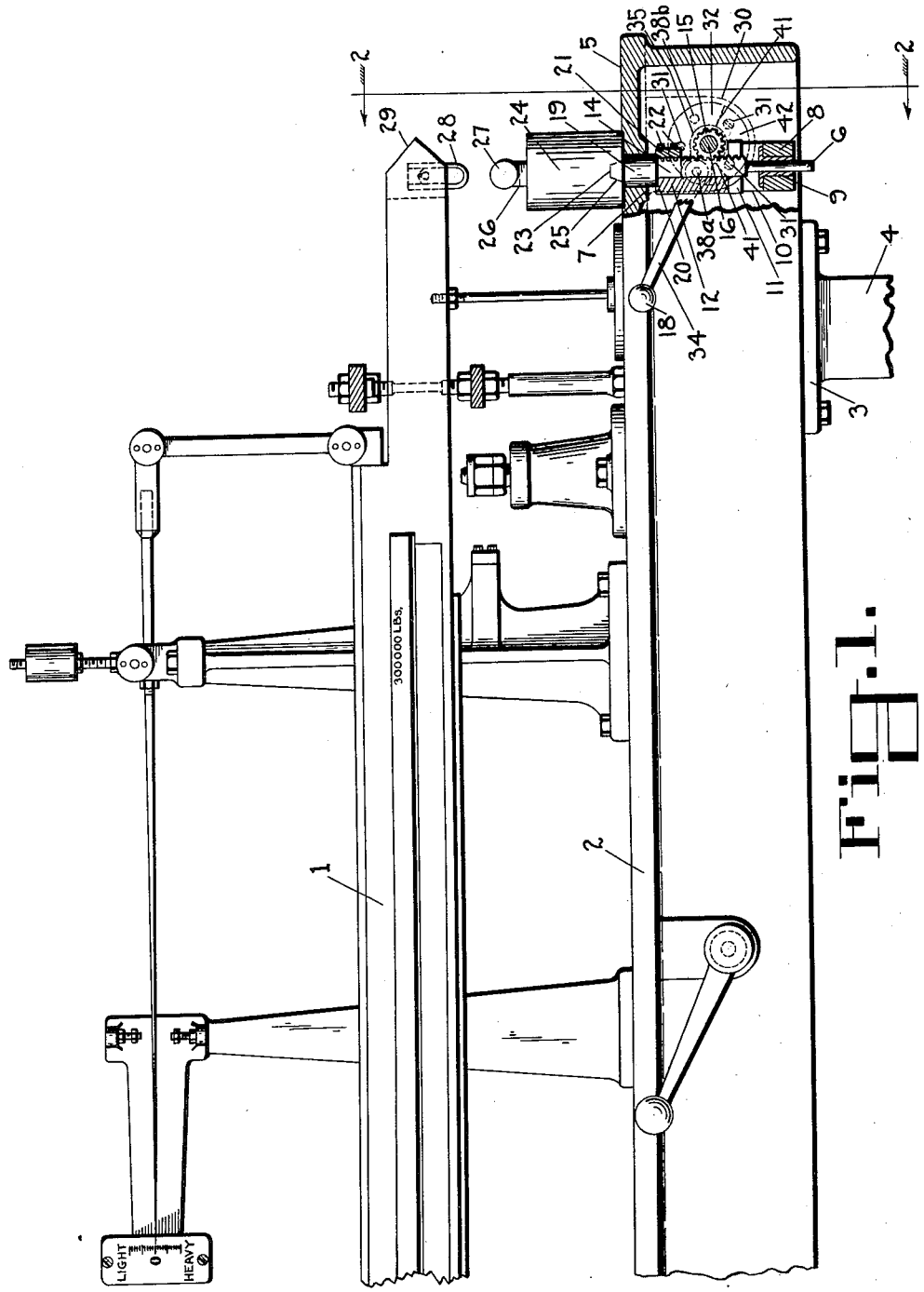

2,014,276

UNITED STATES PATENT OFFICE 2,014,276

COUNTERPOISE MECHANISM FOR TRACK SCALE BEAMS

Alfred Bousfield, St. Johnsbury, Vt., assignor to E. and T. Fairbanks and Company, St. Johnsbury, Vt., a corporation of Vermont Original application March 19, 1931, Serial No. 523,804. Divided and this application August 25, 1934, Serial No. 741,430

4 Claims. (Cl. 265—60)

This invention relates to improvements in counterpoise mechanisms for track scale beams and especially for plate-fulcrum track scales, as disclosed in my application, Serial No. 523,804, Weighing scale beams, filed March 19, 1931, of which this application is a division.

The principal object of the invention is to provide a mechanically operated increased capacity counterpoise for the scale beam, which is under manual control from the front of the scale shelf.

Another object is to provide efficient mechanism for raising and lowering the counterpoise to co-operate with the beam in performing the weighing operation.

With these and other objects in view the invention consists in the novel features of construction, combination of elements and arrangement of parts as hereinafter described and pointed out in the appended claims.

In order that the nature of my invention may be fully understood, I have illustrated certain embodiments of the invention in the accompanying drawings, in which,—

Figure 1 is a front elevation of a weighing scale beam, partly in section, embodying a preferred form of my invention and showing the counterpoise raising and lowering mechanism.

Figure 2 is an enlarged, vertical cross-section on the line 2—2 of Fig. 1, showing the counterpoise operating mechanism.

In the drawings 1 designates the weigh beam of a railroad track scale, mounted on a plate-fulcrum secured to a beam support, as shown in the above-referred to application, the support being attached to the shelf 2, which is supported by the top plates 3 of the pillars 4, one of each being shown.

Adjustable means for increasing to high capacity the weighing range of the beam is located at the outer end 5 of the shelf 2 including a lifting rod 6 (Fig. 1), slidably mounted in a boss 7 in the upper plate of the shelf 2 and a bearing block 8 provided with a bushing 9 and carried by opposed, downwardly inclined integral arms 10 bolted to the opposed, horizontal arms 11 of a bracket 12, which is secured by bolts to bosses 13 on the side plates of the shelf 2. A portion of the lifting rod 6 is provided with a toothed rack 14, which meshes with a gear 15 secured to a shaft 16, which is trunnioned in spaced bosses 17 on the bracket 12 (Fig. 2). The shaft 16 extends outside the shelf 2 and has a crank 18 fastened to its outer end. The upper end of the lifting rod 6 is provided with an enlarged end portion 19 (Fig. 1), the lower face of which rests on the upper end 20 of the bracket 12, in its inoperative position. Mounted above the bosses 17 on extended arms 21 of the bracket 12 is a transverse guide plate 22 adapted to co-operate with the upper end portion 20 of the bracket 12 in holding and guiding the lifting rod 6.

Extending upwardly from the end portion 19 of the lifting rod 6 is a frusto-conical extension or cap 23 (Fig. 1), upon which rests a relatively heavy counterbalancing weight or counterpoise 24 having in its base a frusto-conical opening 25, into which the frusto-conical cap 23 extends and fits, by which arrangement the counterpoise weight 24 is held securely in a vertical position as it is raised to its operative position. Mounted on the top of the counterpoise weight 24 are two spaced, upright clevis-like arms 26 provided with a slidable clevis pin 27 adapted, when the counterpoise weight 24 is raised to its operative position, to be inserted in a beam tip loop 28 pivotally mounted in the bifurcated end 29 of the beam 1, thereby attaching the counterpoise weight to the beam. In operation by simply turning the crank 18, the revolving gear 15 engaging the toothed rack 14 causes the lifting rod 6 and hence the counterpoise weight 24 to be easily raised or lowered as desired. This is a desirable and important advantage to enable the operator to quickly increase the capacity of the beam and to mechanically raise and lower a relatively heavy counterpoise weight when desired. The position on the front of the shelf 2 of the crank 18 for controlling the counterpoise weight 24 operating mechanism renders the control readily accessible to the operator.

In order to provide means for locking and holding the counterpoise 24 in its raised position the outer side of the shelf 2 adjacent to the shaft 16 is provided with a boss 30, upon which is attached by screws 31 a circular crank plate 32 having an inwardly extending tubular bushing 33 mounted on the shaft 16. The crank arm 34 has an elongated hub 35 fastened to the end of the shaft, while spaced above the shaft there is slidably mounted in the hub 35 a spring actuated locking pin 36 carrying an expanded coiled spring 37. The locking pin 36 is adapted to alternately engage spaced circular openings 38a and 38b in the crank plate 32, so as to lock the crank hub 35 and the shaft 16 in a fixed position, as well as the counterpoise 24. It is to be noted that one opening 38a is adapted to hold the locking pin 36 in its inoperative position when the counterpoise 24 is in its lowered position and resting upon the shelf 2, while the other opening 38b is adapted to hold the locking pin in its operative position when the counterpoise 24 is held in its raised or operative position. Moreover, the crank 18 and cooperating parts are in each instance noted above locked in a fixed position both in their inoperative and operative positions by the automatic engagement of the locking pin 36 with the opening 38a and opening 38b respectively. Further, the locking pin 36 must be withdrawn from the opening 36a or 36b in each case preliminary to turning the crank 18 to raise or lower the counterpoise 24. Thus the locking pin 36 is manually operated to be released from its locked position and is automatically operated by the coiled spring 37 to engage the openings 38a and 38b in locking the crank 18 and counterpoise 24 in a fixed position. The inner end of the elongated hub 35 of the crank 18 is provided with a notched portion 39 having opposed inclined ends 40 adapted to engage and cooperate with similar inclined ends 41 of a raised portion 42 on the crank plate 32, in serving to prevent extreme overthrow of the crank hub 35 and the shaft 16 especially in locking the counterpoise 24 in its raised position. Therefore, this locking means provides efficient means for locking the counterpoise 24 in its raised position and at the same time permits the operator to freely use both hands in attaching the beam tip loop 28 to the clevis pin 27 of the counterpoise 24.

In the means for attaching the counterpoise 24 to the beam the counterpoise clevis pin 27 is slidably mounted in openings in the upper ends of the spaced clevis arms 26 and is provided with a circular knurled head 43 and an elongated slot 44 on the upper side, into which extends a depending stop pin 45 screwed into the upper end of the inner clevis arm 26 above the opening therein. Thus the slot 44 serves as a guideway for the stop pin 45, which pin acts to limit the outward movement of the clevis pin 27 by engaging the shoulder 46 of the slot, when the clevis pin is withdrawn and the beam tip loop 28 is being attached to the counterpoise 24. Midway of the clevis pin 27 is an annular groove 47 adapted to engage and receive the beam tip loop 28 when the counterpoise 24 is connected to the beam 1. In operation the clevis pin 27 is pulled out by the operator from its closed position (Fig. 2) so that the inner end of the pin is drawn out to its open position, entering the opening in the inner clevis arm 26 and thus leaving clear the space between the spaced clevis arms 26 for receiving the beam tip loop 28, whereupon the pin 27 is pushed forward through the loop to its closed or operative position therein, whereby the counterpoise 24 and the loop 28 are connected and the counterpoise 24 thus placed in its operative position on the beam.

In operating the counterpoise mechanism the locking pin 36 is released by pulling it out from its inoperative position in the opening 38a, after which the crank 18 is turned by the operator to the right, the shaft 16 turning and through its gear 15 pushing upward the toothed rack 14, which movement raises the lifting rod 6 and the counterpoise 24 seated thereon. When the crank 18 and its arm 34 reach the locking position the locking pin 36 under urge of the coiled spring 37 is automatically thrust into the opening 38b and it thereby locks and holds the counterpoise 24 in its raised position for attaching to the beam by connecting the beam tip loop 28 to the clevis pin 27 of the counterpoise. The locking pin 36 is then withdrawn from the opening 38b and crank 18 turned to the left, the shaft 16 turning the gear 15 and thus lowering the toothed rack 14 and the lifting rod 6 to their inoperative position (Fig. 1), the locking pin 36 automatically engaging the opening 38a, and leaving the counterpoise suspended from the beam 1 in its operative position thereon. After the weighing operation or series of weighing operations have been completed the locking pin 36 is withdrawn from the opening 38a and the crank 18 again turned to the right, thereby raising the lifting rod 6 to engage the counterpoise 24, while the locking pin 36 automatically engages the opening 38b, whereby the counterpoise is held in a fixed position while the beam tip loop 28 is being disengaged from the clevis pin 27, after which the crank is turned to the left and the counterpoise is lowered to its inoperative position on the beam shelf 2, the locking pin 36 again automatically engaging the opening 38a.

While the preferred embodiment of the invention herein shown and described is well adapted to fulfill the objects of the invention, it is to be understood that it is not intended to confine the invention to the precise form of construction herein disclosed, for it is susceptible of modification in various forms, all coming within the scope of the invention.

I claim:

1. In a weighing scale, a weighing beam, means to increase to high capacity the weighing range of the said beam comprising a counterpoise adapted to be raised to a position to co-operate with the tip of the said beam by operating means manually controlled from the front of the scale shelf including a slidably mounted lifting rod supporting the said counterpoise and provided with a toothed rack, a crank attached to a shaft having a gear meshing with the said rack, and attaching means carried by the said counterpoise for attaching the counterpoise to the tip of the said beam comprising upwardly extending spaced clevis arms provided with a slidable clevis pin, and means for connecting the tip of the beam to the said counterpoise comprising a depending beam tip loop pivotally mounted in the tip of the said beam and operatively connected to the clevis pin of the counterpoise in its operative position on the beam.

2. In a weighing scale, a weighing beam, means to increase to high capacity the weighing range of the said beam comprising a counterpoise adapted to be raised to a position to co-operate with the tip of the said beam by operating means manually controlled from the front of the scale shelf, and attaching means carried by the said counterpoise for attaching the weight to the tip of the said beam, means for raising the counterpoise including a crank having its arm attached to a shaft operatively connected to a counterpoise lifting rod, and means for locking and holding the said counterpoise in its raised position comprising a crank plate located opposite the inner side of the crank arm and provided with spaced circular openings, and a spring actuated locking pin mounted in the said crank arm, adapted to alternately engage one of the said spaced openings in locking the counterpoise in its raised or operative position and the other opening in its lowered or inoperative position.

3. In a weighing scale, a weighing beam, means to increase to high capacity the weighing range of the said beam comprising a counterpoise adapted to be raised to a position to co-operate with the tip of the said beam by operating means manually controlled from the front of the scale shelf, and attaching means carried by the said counterpoise for attaching the weight to the tip of the said beam, means for raising the counterpoise including a crank having at the lower end of its arm an elongated hub fixedly mounted on a shaft operatively connected to a counterpoise lifting rod and provided on its inner end with a notched portion having inclined ends, and means for preventing extreme overthrow of the said crank comprising a crank plate positioned opposite the end of the said crank hub and provided with a raised portion having inclined ends adapted to engage the said inclined ends of the crank hub in limiting the movement in either direction of the said crank and shaft.

4. In a weighing scale, a weighing beam, means to increase to high capacity the weighing range of the said beam comprising a counterpoise normally resting on the upper plate of the shelf and adapted to be raised to operative relation with the beam, a slidably mounted lifting rod provided with a toothed rack, guiding means for the said lifting rod, a gear meshing with the said toothed rack and fixedly attached to a shaft extending outside the shelf and provided with an operating crank, an enlarged end portion on the said lifting rod provided with a frusto-conical cap portion adapted to engage a similarly shaped opening in the base of the said counterpoise, whereby the counterpoise is maintained in a vertical position as it is being raised and lowered, a depending beam tip loop pivotally mounted in a bifurcated end portion of the said beam, and attaching means mounted on the top of the said counterpoise comprising spaced, upright clevis arms carrying a slidable clevis pin adapted to be inserted in the said beam tip loop.

ALFRED BOUSFIELD.